United States Patent [19]

Strigle, Jr. et al.

[11] 4,303,599

[45] Dec. 1, 1981

[54] TOWER PACKING

[75] Inventors: Ralph F. Strigle, Jr., Akron, Ohio; Kenneth E. Porter, MacclesField, England

[73] Assignee: Norton Company, Worcester, Mass.

[21] Appl. No.: 847,477

[22] Filed: Nov. 1, 1977

[51] Int. Cl.$^3$ ............................................. B01F 3/04
[52] U.S. Cl. .............................. 261/98; 261/DIG. 72
[58] Field of Search ................................... 261/94–98, 261/DIG. 72; 210/150, 151

[56] References Cited

U.S. PATENT DOCUMENTS

| | | | |
|---|---|---|---|
| Re. 27,217 | 11/1971 | Eckert | 261/94 |
| 2,834,466 | 5/1958 | Hament | 261/DIG. 72 |
| 3,311,356 | 3/1967 | Eckert | 261/94 |
| 3,618,910 | 11/1971 | Arndt | 261/94 |
| 4,041,113 | 8/1977 | McKeown | 261/98 |

FOREIGN PATENT DOCUMENTS

| | | | |
|---|---|---|---|
| 316497 | 11/1919 | Fed. Rep. of Germany | 261/94 |
| 546351 | 3/1932 | Fed. Rep. of Germany | 261/DIG. 72 |
| 1029346 | 5/1958 | Fed. Rep. of Germany | 261/94 |
| 2603124 | 8/1976 | Fed. Rep. of Germany | 261/DIG. 72 |
| 768316 | 2/1957 | United Kingdom | 261/DIG. 72 |
| 917906 | 2/1963 | United Kingdom | 261/DIG. 72 |
| 1385672 | 2/1975 | United Kingdom | 261/DIG. 72 |
| 1385673 | 2/1975 | United Kingdom | 261/DIG. 72 |

OTHER PUBLICATIONS

Norton, "Design Information for Packed Towers", Copyright 1971, Norton Co., Akron, Ohio, Bulletin DC-11.

*Primary Examiner*—Richard L. Chiesa
*Attorney, Agent, or Firm*—Rufus M. Franklin

[57] ABSTRACT

A dumped packing for use in gas liquid contact apparatus is provided of the type where the packing comprises a perforated base member which curves around a notional axis to define a space which is partially enclosed by the base member. There is at least one oppositely directed curved bridging member carried by the base member, and preferably formed therefrom, which extends clear of the base member into the space. In the present invention the base member cooperates with the bridging member to bound a space having dimensions roughly equal when measured along lines at right angles to each other. In a preferred form the base member has the general shape of an ellipse and portions of the bridge member are cut therefrom to form fingers which extend into the interior of the space defined by the base member and the bridge member.

5 Claims, 3 Drawing Figures

TOWER PACKING

BRIEF DESCRIPTION OF THE INVENTION

The present invention is directed to dumped packings for use in liquid contact apparatus, and preferably to the type where the packing members are stamped, by means of a high speed stamping press, from a strip of metal fed into the press. The metal strip in the preferred form, is cut and bent around a notional axis to form an elliptically curved base member with an oppositely curved bridging member, the bridging members being displaced towards the notional axis.

PRIOR ART

In the prior art there are many dumped packing systems for providing mass transfer surfaces which can be wetted by a liquid passing counter-current to a vapor with which mass transfer is to occur. Examples of such dumped packings are shown in U.S. pending application Ser. No. 653,006 of Ellis and Priestley, this application being owned by Citten Ltd. and being licensed to Norton Company, assignee of the present application. For convenience, packings of the type described in this Ellis and Priestley application will be referred to as the "Citten" packings. Other types of patented and/or commercial metal packings are illustrated in Eckert U.S. Pat. No. Re. 27,217 and U.S. Pat No. 3,311,356 (also owned by the assignee of the present invention) German Pat. No. 316,497, German Pat. No. 546,351, British Pat. No. 768,316, British Pat. No. 917,906, British Pat. No. 1,385,672, U.S. Pat. No. 2,834,466 and U.S. Pat. No. 4,041,113. All of these patents illustrate various different types of more or less commercially available packings. Other packings now on the market are those described in Bulletin DC-11 "Design Information for Packed Towers," first published by Norton Company in 1971.

REFERENCE TO THE DRAWINGS

THE PREFERRED EMBODIMENT

Figure 1:
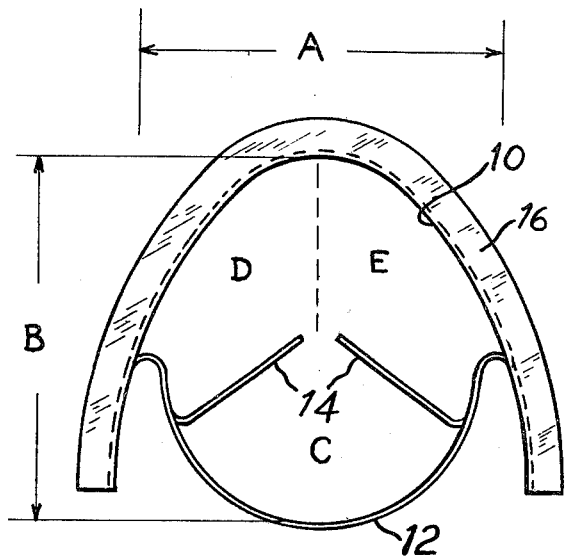
FIG. 1 is a side view along the notional axis of one preferred embodiment of the invention.
Figure 2:
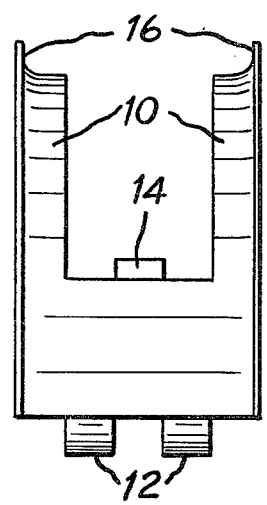
FIG. 2 is an end view perpendicular to the notional axis showing cross-section of the packing and FIG. 3 is a plan view of the flat strip from which the packing element of FIGS. 1 and 2 is formed.
Figure 3:
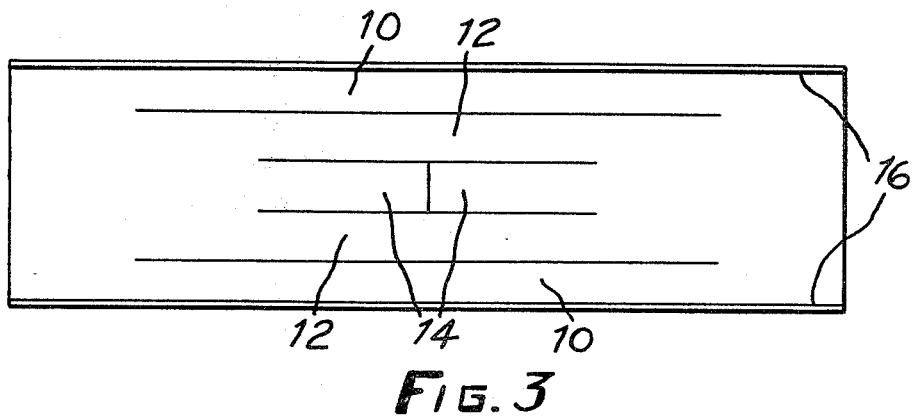

Referring now specifically to FIGS. 1, 2 and 3, the packing element comprises a base member 10 and a bridge member 12. The bridge member has two bridging portions and two tongues 14 extending into the space defined by the cooperating surfaces of the base member 10 and the bridge member 12.

The base member 10 has flanges 16 which serve to additionally strengthen the base member to give it structural rigidity as well as to space it from adjacent pieces of packing in a random bed.

As can be seen, the base member is generally in the shape of an ellipse although it is actually formed with three separate centers of curvature. The base member can equally be hyperbolic, parabolic or polygonal, the important feature being that it have a pointed top. The top portion has a radius of curvature, in the specific example shown, of about 0.38", and the skirt portions each have a radius of curvature of about 1.38". The bridging member has a radius of curvature of almost ½". As a result of this construction the space defined on one side by the base member and on the other side by the bridging member has nearly equidistant dimensions in several directions and a relatively uniform distribution of surface around the space.

With the particular construction shown in the preferred embodiment, the semi-elliptical shape gives a ratio of the inside height of the opening to the maximum width of the opening of almost 1.0. This ratio is the dimension B over the dimension A as illustrated on FIG. 1. In actual practice it is found that the most successful packing elements made in accordance with this invention have a ratio of at least 0.97; in any case the ratio of B to A must be at least 0.75. This provides a large hydraulic radius, which is defined as the area of the cross-section divided by the perimeter of the cross-section. In general a circle has the highest hydraulic radius whereas deviations therefrom will give a lower hydraulic radius. In our packing we want the highest hydraulic radius consistent with the pointed tip construction.

Another feature of the invention mentioned briefly above is the fact that the semi-elliptical shape (or other pointed shape) of the base member provides a structure which cannot rest, in equilibrium, on its nose. Accordingly the piece will tend to tip either to the side so that the notional axis is vertical or will tip off its nose so that the piece will rest with the long axis of the ellipse extending at an appreciable angle to the vertical. This means that the gases passing up through the packing will see an open packing such as the view in FIG. 2. Accordingly the capacity of the packing is very high, considering the amount of surface area provided by the packing. If the packing stayed in the position as shown in FIG. 1, so that the long axis of the ellipse remained vertical the gases passing upwardly through the packed column would see a structure which would be almost completely shadowed by the surface 12, 10 and 14 which would be extending across the direction of the gas flow.

Another feature of the invention is that the lower curved section, as shown by the bridging members 12, is narrower along the notional axis than the tip of the ellipse. This acts to add instability to the piece so that it will not tend to rest at the bottom of the curve of the bridging member 12. Because the center of gravity is above this point and because of the relatively narrow area of the bridging member, the element will tend to tip to one side or the other rather than come to equilibrium on the bottom of the curved bridging members 12.

Another feature of the invention is the fact that there are no appreciable amounts of wide horizontal surfaces in this packing when it is provided in the tower even if the packing rests with one side of the ellipse at a tangent to the horizontal. This results from the relative openness of the packing, due to the large area of the bridging elements 12 and the tabs 14. The relatively wide surface of the base member 10 has been spread apart and broken up into a number of much smaller surface areas, thus the liquid (e.g. water) can cover both surfaces of the various portions of the element even when these surfaces are horizontal.

It should also be noted that, while wide horizontal surfaces should be avoided, the surfaces should be wide enough to cause horizontal displacement of the liquid (e.g. water) wetting the packing element surfaces to perpetuate a uniform distribution of the liquid throughout the cross-section of the column. Accordingly the surfaces are made sufficiently wide so that the liquid (e.g. water) will not ball up on the surfaces and drip from them as if they were made of wire.

Another feature of the packing is that the openings must be large enough to permit flow of liquid without sufficient bridging of the liquid to close the various openings through which the gas must pass.

Another aspect of the invention is the fact that the fingers 14, extending into the interior of the packing element, effectively provide three channels for flow of the gas, these being schematically indicated as the bottom channel C and the two channels D and E which are separated by an immaginary line running along the long axis of the ellipse. In a preferred embodiment these three cross-sectional areas, C, D and E, are about equal to provide a uniform and low impedance to flow of gas parallel to the notional axis of the packing element, thus providing uniform distribution of the gas for mass transfer purposes.

While the relative radii of curvature, particularly of the base member and the bridging member, are not critical parameters their relative functions have been generally outlined above. In general, the relationship of the geometry (whether they are polygonal straight surfaces or uniformly curved surfaces or elliptical) is such that the piece will not come to rest with both its long axis vertical and its notional axis horizontal. Accordingly the displaced surfaces cannot completely shadow the projected area in the vertical direction, even when the notional axis is horizontal. For these purposes the elliptical or pointed shape of the base member provides the desired instability and the narrow dimension (parallel to the notional axis) of the bridging member provides a high probability that the piece will come to rest with the notional axis at an angle to the horizontal and not in the position shown in FIG. 1. This is a very unstable position due to the narrowness of the supporting surface defined by the two bridge members 12 and the fact that the center of gravity is considerably above those two bridging members. Where the element is larger, the bridging members 12 can also be made elliptical or pointed to prevent the element from resting on the bridging members with the long axis of the ellipse in a vertical position.

It also can be seen from examination of FIGS. 1 and 2 that the areas of metal surface on both the top and bottom of the space are roughly equivalent.

A packing element having the general dimensions shown in FIGS. 1 and 2 was tested against a number of commercially available packing elements as well as experimental packing elements made essentially in accordance with FIG. 3 of the above mentioned Ellis and Priestley application, this being referred to as Citten I in the following table.

The packings were tested in a 15" laboratory still using an Iso-Octane and Toluene system at total reflux and atmospheric pressure to obtain data on capacity and efficiency of distillation. The following results were obtained:

| Packing | Packing Factor | HETP (Feet) |
|---|---|---|
| 1" Pall Ring | 51 | 1.35 |
| 1½" Pall Ring | 34 | 1.66 |
| #1 Hy-Pak | 44 | 1.43 |
| Citten I | 34 | 1.55 |
| Present Invention | 24 | 1.42 |
| 2" Metal Pall Ring | 23 | 2.11 |

The Metal Pall Rings were of the type manufactured by Norton Company as illustrated on page 3 of Bulletin DC-11 first copyrighted in 1971 and republished in 1976 by Norton Company (3M-31357-1276).

1 Hy-Pak is generally as shown on page 2 of the above 1976 bulletin.

As mentioned, the Citten packing corresponded to FIG. 3 of the above identified Ellis and Priestley application. The instant invention was a packing of the type shown in FIGS. 1 and 2.

The above results demonstrate that the packing of the instant invention is superior, in overall performance, to the other packing shapes tested. It has better efficiency and better capacity than the 1½" pall ring in distillation applications. Its efficiency is not quite as good as the 1" pall ring but the packing factor is much superior. It has a capacity (packing factor) almost equivalent to a 2" pall ring with a much higher efficiency. Incidentally the packing factor is a dimension-less number which is determined empirically as described on pages 4 and 5 in the above identified Bulletin DC-11 published by Norton Company. It is a relative number and the lower the packing factor, the better the capacity of a packed column using the product.

Utilizing the basic concepts of the present invention different types of packings can be designed for different applications. For example, as the size of the packing element goes up it can have an HETP comparable to a 2" pall ring but with considerably higher capacity. Conversely the smaller size can have an HETP which is lower than a 1" pall ring but with a higher capacity.

What is claimed is:

1. In a dumped packing for use in gas/liquid contact apparatus of the type where the packing comprises a perforated base member with free ends which curves around a notional axis to define a space which is at least partially enclosed by said base member, and at least one oppositely directed curved bridging member carried by said base member and extending clear of the base member into said space and defining the lower boundary thereof, the improvement wherein the base member is curved in the general shape of an ellipse which has an apex portion and open end portions, the apex portion having a shorter radius of curvature than the open end portions, and the height of the space (B FIG. 1), as measured from the apex of the base member to the bottom of the bridging member, being:
   (a) substantially greater than the thickness of the base member, as measured parallel to the notional axis, at the open end, and
   (b) greater than 0.75 times the width of the space (A FIG. 1), whereby said packing has a high hydraulic radius.

2. The packing of claim 1 wherein the bridging member extends beyond the open end of the base member.

3. The packing of claim 1 wherein the bridging member has at least one punched out tab which extends into the space.

4. The packing of claim 1 wherein the base member and the bridging member substantially completely shadow the projected area of the element as viewed from the bottom thereof but not when viewed from a direction which is normal to both the notional axis and the long axis.

5. The packing of claim 1 wherein the bridging member has a pair of punched out tabs which extend into the space, areas between the tabs and the base are about equal to each other and to the area between the two tabs.

* * * * *